United States Patent [19]

Flodman et al.

[11] Patent Number: 4,831,089
[45] Date of Patent: May 16, 1989

[54] METHOD FOR THE PRODUCTION OF AMINO RESIN

[75] Inventors: Leif A. Flodman, Sundsvall; Per E. G. Gabrielsson, Kvissleby, both of Sweden

[73] Assignee: Dynobel A/S, Stockholm, Sweden

[21] Appl. No.: 147,297

[22] Filed: Jan. 22, 1988

[30] Foreign Application Priority Data

Jan. 26, 1987 [SE] Sweden ................................ 8700293
Dec. 1, 1987 [SE] Sweden ................................ 8704793

[51] Int. Cl.$^4$ ............................................. C08L 61/26
[52] U.S. Cl. .................................. 525/497; 156/331.3; 156/335; 525/516
[58] Field of Search ....................... 525/497, 498, 516; 528/164, 163

[56] References Cited

U.S. PATENT DOCUMENTS 3,734,918  5/1973  Mayer et al. ......................... 525/497
4,458,049  7/1984  Diem et al. .......................... 524/595

FOREIGN PATENT DOCUMENTS 0069267  1/1983  European Pat. Off. .
83523    7/1983  European Pat. Off. .
152318   8/1985  European Pat. Off. .
190068   8/1986  European Pat. Off. .
253488   1/1988  European Pat. Off. .
590305   8/1987  Switzerland .
2027439  2/1980  United Kingdom .

Primary Examiner—Theodore E. Pertilla
Attorney, Agent, or Firm—Burns, Doane, Swecker & Mathis

[57] ABSTRACT

The invention relates to a method for the production of a resin which is used for manufacturing of an adhesive for cellulose based products. According to the method 30-70% by weight of a urea phenol resin with a molar ratio of 1.4-0.6 moles or urea, 0.006-0.3 moles of phenol and 0-0.04 moles of melamine per mole formaldehyde, are mixed with 70-30% by weight of a melamine resin with a molar ratio formaldehyde: melamine of 1.7-2.4. The urea-phenol resin has been prepared by adding a cross-linking agent containing a co-condensate of phenol, formaldehyde and urea to a pre-condensate of formaldehyde, urea and optionally melamine and condensing under acid conditions.

According to a further embodiment the cross-linking agent is added to a evaporated condensate of formaldehyde, urea and optionally melamine.

8 Claims, No Drawings

METHOD FOR THE PRODUCTION OF AMINO RESIN

The present invention relates to a resin for the production of an adhesive for cellulose based products and to a method for production of the resin. The invention also relates to a process for the production of glued wood products.

At the production of wood products, for example particle board, wood fibre board, plywood etc, binders based on amino resins are usually used and, among these, mainly urea-formaldehyde resins. It is well known that the release of formaldehyde, originating from the amino resin adhesives, from glued wood products causes serious problems. Authorities in different countries have made the limits for the level of formaldehyde in living environments severer. Since a great amount of structural elements consist of glued construction materials these restrictions makes the production of adhesives with lower formaldehyde emission necessary. The producers of adhesives have made great efforts to reduce the formaldehyde emission. Several patents and patent applications disclose different production processes for amino resins of varying compositions, which processes are said to give resins which give a low release of formaldehyde at gluing and from the finished products. The EP patent application 190068, for example, relates to a process for the production of an amino resin based adhesive for wood products with low release of formaldehyde. The process relates to condensation of the components formaldehyde, urea, melamine and phenol in several stages, in a fixed sequence.

For conventional urea-formaldehyde resins it is necessary that the molar ratio urea:formaldehyde is kept higher than about 1:1.2 in order to achieve a satisfactory strength of the finished wood products. It is known that a lowered molar ratio between formaldehyde and urea (F/U) gives a decreased formaldehyde emission from board materials glued with pure UF-resins. However, it is also known that this leads to other disadvantages of the finished board material, for example an increased swelling, impaired strength properties and, in certain cases, an increased brittleness. Manufacturers of particle board have noted that these adhesives are more susceptible to variations in the production conditions, eg increased moisture content of the chips, that longer press times are required, that there is risk of drying out of glued chips and also that an increased glue addition often is required.

An important factor resulting in these disadvantages at low molar ratios is a decreased degree of cross-linking. At lower molar ratios resins do, to a certain extent, begin to become more and more linear in their structure, compare novolacs of phenol resins.

It is known to use melamine to cross-link such resins. By increasing the degree of cross-linking of the resin, the swelling of boards glued with such resins will decrease and the strength will increase.

Several resins are made with an addition of phenol to the urea-formaldehyde resin to improve the properties. The additions are generally large and are usually made together with a large part of melamine. These resins consist mainly of a mixture of urea-formaldehyde resin and phenol-formaldehyde resin, although the phenol is added during the reaction process. This is due to the fact that urea and phenol will only react with substantial yields if certain conditions are fulfilled. A co-condensation of phenol, formaldehyde and urea is only obtained if methylol phenol is reacted with an excess of urea at an acid pH. If a mixture of urea and phenol is reacted with formaldehyde, no substantial yield of a co-condensate is obtained either at an acid or alkaline pH. Nor is there a co-condensation when methylol urea is reacted with an excess of phenol at different pH values. At an alkaline pH the methylol group is dissociated from the methylol urea. The obtained formaldehyde is added to the phenol which then condensates with itself. At an acid pH the self-condensation of the urea is the dominating reaction. The reaction between urea and methylol phenol has been confirmed by $^{13}$C-NMR.

It has now been found that this so-called phenol/urea co-condensate with its free amide- and methylol groups more simply, and in a better way, makes it possible to react a phenol, in derivatized form, into a pre-condensate consisting mainly of formaldehyde and urea and optionally a smaller amount of melamine.

The present invention thus relates to a method for production of a resin with a low molar ratio between formaldehyde and urea which will give wood products with a satisfactory moisture resistance and with a low formaldehyde emission at the production of the glued wood products and from finished such products.

The process for the production of the resin is evident from the patent claims.

One component of the resin consists of a condensation product of formaldehyde, urea and phenol. It is prepared from a pre-condensate of formaldehyde and urea. A cross-linking agent is added to the pre-condensate and the cross-linking agent contains a co-condensate of phenol and urea or methylol phenol and urea. By addition of this reagent an increased degree of cross-linking is obtained despite a low molar ratio (F/U). The strength properties of the glued wood products are increased in comparison with a resin having the same molar ratio (F/U) but without cross-linking reagent. Also other, above mentioned, disadvantages are minimized/eliminated. To further reduce the swelling of finished board materials smaller amounts of melamine can be present in the resin, which increases the cross-linking of this. When melamine is present it is included in the pre-condensate.

The addition of the phenol/urea cross-linking agent is made in the process step wherein the resin shall be condensed, ie at an acid pH. The mentioned cross-linking agent can thus also be co-reacted. The process can be described by the following diagram.

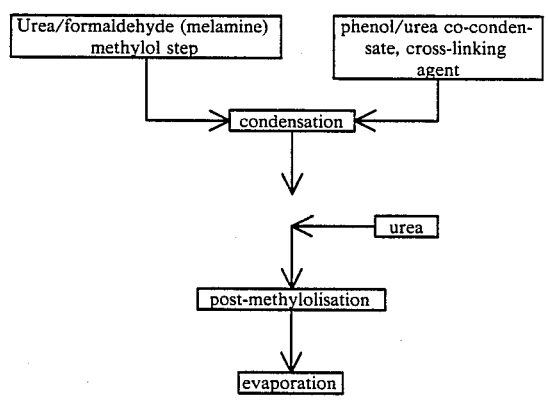

Even when the cross-linking agent is added in the form of methylol phenol and corresponding amount of urea as in the phenol/urea co-condensate above, the addition is made in the process step wherein the resin shall be condensed, ie at an acid pH. The reaction between methylol phenol and urea to a cross-linking reagent occurs at the same time during the condensation process for the urea-formaldehyde resin. The urea reacts preferentially with the methylol phenol. This process can be described by the following diagram.

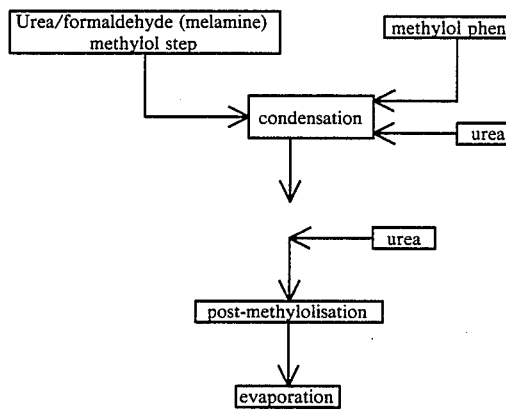

Resin produced in the above described manner and with this cross-linking reagent obtains improved properties. The gel time and the gelling process become more distinct (rapid hardening). A melamine formaldehyde resin is added to this resin and thereby a resin mixture, suitable for producton of adhesive for manufacturing of moisture resistant wood products for exterior use, is obtained. Boards produced with this resin mixture will get a lower swelling and an increased strength, above all a satisfactory wet strength and a satisfactory dimension stability, compared with a resin without a cross-linking agent. The formaldehyde emission is as low as for corresponding resins of low molar ratios, ie it fulfills the German E1 requirement $\leq 10$ mg $CH_2O/100$ g particle board.

According to a further embodiment of the invention a cross-linking agent in the form of a phenol/urea co-condensate or a methylol phenol is added after the evaporation of the condensed urea (melamine) formaldehyde reaction mixture, i.e. to the finished urea (melamine) formaldehyde condensate. In this method the additions of urea are carried out in the same way as above, i.e. to the condensation step and after that. At addition to this finished condensate, the acid conditions which the cross-linking agent needs to react, are obtained by addition of the acid hardener to the resin. At the production of particle boards, the acid particles also contribute to the acid environment. When hardening the resin in the board, the methylol phenol is able to react with free urea present in the resin and is able to be reacted into the resin. The process can be described by the following diagram.

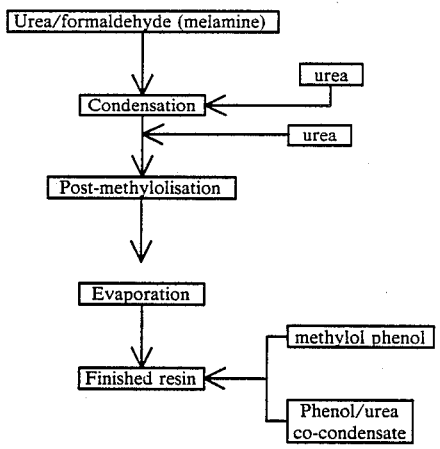

This process has certain industrial and technical advantages compared with the two other processes. It has surprisingly been found that in spite of this method allowing for a very short time of reaction of the cross-linking agent and in spite of that this reaction is not carried out with a pre-condensate of urea and formaldehyde, but with a more condensed urea-formaldehyde condensate, very good properties of the boards manufactured with this resin are obtained. The boards will get as good strength properties and as low emission of formaldehyde as boards manufactured with resin produced according to the first described processes. However, somewhat inferior swelling properties are obtained.

The invention also relates to the use of methylol phenol or phenol/urea co-condensate, prepared according to the above, as cross-linking agent, at an acid pH, for urea formaldehyde condensates, which optionally contain melamine.

If the process with addition of the cross-linking agent to the finished urea (melamine) formaldehyde condensate is used when producing the resin, the cross-linking agent can be added to the melamine resin in stead of to the finished condensate.

At the production of resin according to the present invention a pre-condensate of urea and formaldehyde, and optionally a minor amount of melamine, is first prepared by a methylolisation step. Methylolisation step is intended to mean addition of formaldehyde to urea, melamine and phenol, respectively, for formation of methylol monomers. The molar ratio urea/formaldehyde is 0.15 to 1 mole of urea/mole formaldehyde, suitably 0.25 to 0.75 and preferably 0.3 to 0.4. The mole ratio melamine/formaldehyde is 0 to 0.04. suitably 0.006 to 0.027 moles of melamine/mole formaldehyde. The reaction is carried out at a temperature of from 75° to 90° C. and at a pH of from 8.0 to 8.6, preferably from 8.2 to 8.4.

The cross-linking agent in the form of a phenol/urea co-condensate is produced by methylolisation of phenol at a pH of from 8.5 to 9.0, preferably form 8.7 to 8.9 and at a temperature of from 50° to 70° C. Urea is then added and the temperature raised to 70° to 90° C. and the reaction is allowed to take place at a pH of from 4 to 6, preferably from 4.7 to 4.9. The molar ratio phenol/formaldehyde is from 3.3 to 0.1, preferably from 0.3 to 0.7 moles of phenol/mole formaldehyde and the molar ratio urea/phenol is 1 to 10, preferably 3.5 to 6.5 moles of urea/mole phenol.

This cross-linking agent is added to the pre-condensate and the pH is adjusted to 4 to 7, suitably to 4.5 to 5.5 and preferably to 4.8 to 5.0 and the condensation takes place at 75° to 85° C. to a suitable viscosity. The viscosity varies depending on the concentration of the formaldehyde and the viscosity which is desired by the user of the resin. The viscosity is usually within the range of from 200 to 1500 mPa.s at 20° C. A suitable viscosity at formal-dehyde of 50% can be from 200 to 250 mPa.s. The reaction is stopped by raising the pH to 7.5 to 8.0. Further urea is then added for post-methylolisation in a known manner. The molar ratio in the final resin will be 1.4 to 0.6 moles of urea/mole formaldehyde, suitably 1.05 to 0.9 and preferably 0.97 to 0.93, 0 to 0.04 moles of melamine/mole formaldehyde, suitably 0.006 to 0.027, 0.006 to 0.3 moles of phenol/mole formaldehyde, suitably 0.02 to 0.2, preferably 0.041 to 0.2.

Alternatively the following are added to the precondensate, a cross-linking agent in the form of methylol phenol (prepared with a molar ratio of 3.3 to 0.1, preferably 0.3 to 0.7, moles of phenol/mole formaldehyde) and, separately, 1 to 10, preferably 3.5 to 6.5 moles of urea (per mole of phenol). The reaction is carried out as above and the obtained resin has the same molar ratio as above.

At the production according to the third method a similar pre-condensate as in the two other methods is prepared. To this pre-condensate 1-10 moles of urea (calculated per mole of phenol) are added, preferably 3.5-6.5 moles. The reaction is then carried out in the same way as earlier. After evaporation of the condensate a cross-linking agent in the form of methylol phenol (prepared with the same mole ratio as above) is added to the condensate. When phenol/urea co-condensate (prepared in the same way as above and thus containing 1-10 moles of urea) is used as cross-linking agent a part of the urea which is added for post-methylolisation is redistributed. A part of that urea is added to the pre-condensate, whereafter the condensation is carried out in the same way as earlier. The resin mixtures prepared in this way will get the same final molar ratio as the earlier prepared resins.

The melamine formaldehyde resin which is mixed with the urea phenol resin is prepared in a conventional manner with a molar ratio formaldehyde:melamine of 1.7-2.4, preferably 1.8-2.1 30-70 percent by weight of the melamine resin are mixed with 70-30 percent by weight of the urea-phenol resin.

At the production of particle board with the present resins conventional production processes are used. The originally very moist chips are dried to such a dry content that the total moisture content after the addition of the adhesive does not exceed the critical limit for steam blister. To decrease the susceptibility to moisture a hydrophobing agent is added such as a mineral wax or a natural or synthetic paraffin wax. If desired known formaldehyde binding agent, such as urea, can be added together with the hydrophobing agent. When the dry chips have been glued they are pressed at press temperature of about 185° to 220° C. The amount of added adhesive is normally between 7 and 12 percent dry resin based on the weight of dry chips. A conventional hardener is used, such as ammonium chloride, ammonium sulphate, suitable inorganic and organic acids. The press times are in the range of from 8 to 12 s/mm particle board. The invention is illustrated in the following examples.

EXAMPLE 1

Preparation of the urea-phenol resin Methylolisation step

A reaction mixture of 4386 g of 50% formalin is reacted with 1462 g of urea and 113 g of melamine. At the addition, the temperature is about 50° C. The temperature of the reaction mixture is raised to 80° C., the pH is adjusted to 8.2-8.4.

The reaction is carried out for 20 minutes. The mole ratio is then lowered by addition of 390 g of urea. The reaction is then allowed to go on for another 15 minutes.

Condensation

To the above reaction mixture an earlier prepared phenol/urea co-condensate is added as a cross-linking agent (after 35 minutes) and the pH is adjusted to 4.8-5.0.

The reaction mixture is allowed to condense at 78° C. until a viscosity of 230-250 mPas (25° C.) is obtained. The reaction is stopped with sodium hydroxide (pH=7.5-8.0) and 1836 g of additional urea is added. The resin solution is evaporated and cooled to room temperature.

The mentioned phenol/urea co-condensate is manufactured according to the following method:

120 g of 50% formalin, 94 g of phenol and 100 g of water are added to a flask. The pH is adjusted to 8.7-8.9 and the temperature is kept at 60° C. for 60 minutes. 300 g of urea and 150 g of water is then added to the methylol phenol. The temperature is raised to 80° C. and the reaction time is 60 minutes at pH 4.7-4.9.

Preparation of melamine resin 5698 g of 39% formaldehyde are added at 25° C. and at a pH of 7.8-8.6. Then 4286 g of melamine are added, whereafter the temperature is raised rapidly to 90°-92° C. and the pH is kept at 8.8-9.1. The reaction mixture is allowed to condense until a water tolerance of 1:1.2 at 25° C. is reached. The solution is cooled rapidly and the pH is adjusted to 9.4-9.7.

57 percent of this melamine resin are mixed with 43 percent of the phenol-urea resin, whereby a resin suitable for production of moisture resistant particle boards for exterior use is obtained.

EXAMPLE 2

Preparation of urea-phenol resin Methylolisation step

A reaction mixture of 10.750 g of 50% formalin is reacted with 3597 g of urea. At the addition the temperature is about 50° C. The temperature of the reaction mixture is raised to 80° C., the pH is adjusted to 8.2-8.4.

The reaction is carried out for 20 minutes. Then the mole ratio is lowered by addition of 960 g of urea. The reaction is allowed to continue during another 15 minutes.

Condensation 2370 g of an earlier prepared methylol phenol are added together with 735 g of urea as a cross-linking agent to the above reaction mixture (after 35 minutes) and the pH is adjusted to 4.8-5.0.

The reaction mixture is allowed to condense at 78° C. until a viscosity of 230-250 mPas (25° C.) is obtained.

The reaction is stopped with sodium hydroxide (pH=7.5-8.0) and 4508 g of additional urea is added. The resin is evaporated and cooled to room temperature.

The mentioned methylol phenol is prepared according to the following: 120 parts of 50% formalin, 94 parts of phenol and 100 parts of water are added to a flask. The pH is adjusted to 8.7-8.9 and the temperature is kept at 60° C. for 60 minutes.

45 percent of the melamine resin from example 1 is mixed with 55 percent of this urea phenol resin, whereby a resin suitable for the production of moisture resistant particle boards for exterior use is obtained.

EXAMPLE 3

Methylolisation step

The methylolisation step is carried out in the same way as in example 1.

Condensation 300 g of urea and 150 g of water are added to the reaction mixture (F/U=2.0). The pH of the reaction mixture is lowered to 4.8-5.0. The temperature is raised to about 80° C. and the condensation is allowed to go on to a viscosity of about 300-320 mPas (25° C.). The reaction is then stopped with sodium hydroxide (pH=7.5-8.0) and 2148 g of additional urea are added. The condensate is evaporated to 65%. After the evaporation the cross-linking agent methylol phenol (314 g) (F/P=2.0) is added and the resin solution is finally cooled to room temperature.

57 percent of the melamine resin from example 1 are mixed with 43 percent of the phenol-urea resin, whereby a resin suitable for production of moisture resistant particle boards for exterior use is obtained.

EXAMPLE 4

Urea/phenol co-condensate is added after evaporation.

Phenol/urea co-condensate

The separately prepared phenol/urea co-condensate can be added in a similar way as in example 3, i.e. after evaporation. 120 g of 50% formalin, 94 g of phenol and 100 g of water are added to a flask. The pH is adjusted to 8.7-8.9 and the temperature is kept at 60° C. for 60 minutes. 300 g of urea and 150 g of water are then added to the methylol phenol. The reaction mixture is allowed to react at 80° C. for 60 minutes at pH 4.7-4.9.

Parallel to this the other resin component is prepared according to the following:

Methylolisation step

Is carried out in the same way and with the same amounts as in example 1.

Condensation step

To the reaction mixture from the methylolisation step 300 g of urea are added, which have been redistributed from the last urea addition and the pH is lowered to 4.8-5.0. The reaction mixture is condensed according to example 2 at 80° C. to 230-250 mPas 25° C. The reaction is stopped with sodium hydroxide to pH 7.5-8.0 and additional urea is added 2148-300 g. The resin is evaporated to such a dry content that at addition of the separately prepared phenol/urea co-condensate (764 g), the dry content will be about 65% in the finished resin.

45 percent of the melamine resin from example 1 are mixed with 55 percent of this urea-phenol resin, whereby a resin suitable for the production of moisture resistant particle boards for exterior use is obtained.

We claim:

1. A method for the production of a resin which is useful for manufacturing an adhesive for cellulose based products, comprising the steps of:
   (a) preparing a urea phenol resin by the steps of:
       (1) adding to a pre-condensate of formaldehyde and urea, a cross-linking agent containing a co-condensate of phenol, formaldehyde and urea, or containing urea and a co-condensate of phenol and formaldehyde, thereby forming a mixture,
       (2) condensing the mixture under acid conditions,
       (3) stopping the condensation reaction by alkalization,
       (4) thereafter adding additional urea to the mixture to adjust the final molar ratio to between about 1.4 and about 0.6 moles urea, between about 0.006 and about 0.3 moles phenol and between 0 and about 0.04 moles melamine per mole formaldehyde, thereby forming the urea phenol resin,
   (b) mixing the urea phenol resin of step (a) with a melamine resin prepared by condensing melamine and formaldehyde at a molar ratio of formaldehyde:melamine of about 1.7-2.4,
wherein the amounts of urea phenol resin and melamine resin in said mixing step are from about 30 to about 70% by weight, and from about 70% to about 30% by weight, respectively.

2. A method according to claim 1, wherein the cross-linking agent is prepared with a molar ratio of 3.3-0.1 moles of phenol/mole formaldehyde and 1-10 moles of urea/mole phenol at a pH of 4-6 and a temperature of 70°-90° C.

3. A method according to claim 2, wherein the cross-linking agent is prepared at a pH of 4.7-4.9.

4. A method according to claim 1, wherein said pre-condensate further includes melamine.

5. A method for the production of a resin useful for manufacturing an adhesive for cellulose based products, comprising the steps of:
   (a) preparing a urea phenol resin by adding to an evaporated condensate of formaldehyde and urea, a cross-linking agent containing a co-condensate of phenol, formaldehyde and urea or containing urea and a co-condensate of phenol and formaldehyde, wherein the final molar ratio of the resin is between about 1.4 and about 0.6 moles urea, between about 0.006 and about 0.3 moles phenol and between 0 about 0.04 moles of melamine per mole of formaldehyde,
   (b) mixing the urea phenol resin of step (a) with a melamine resin prepared by condensing melamine and formaldehyde at a molar ratio of formaldehyde:melamine of from about 1.7 to about 2.4,
wherein the amounts of urea phenol resin and melamine resin in said mixing step are from about 30 to about 70% by weight, and from about 70% to about 30% by weight, respectively.

6. A method according to claim 5, wherein the cross-linking agent is prepared with a molar ratio of 3.3-0.1 moles of phenol/mole formaldehyde and 1-10 moles of urea/mole phenol at a pH of 4-6 and a temperature of 70°-90° C.

7. A method according to claim 6, wherein the cross-linking agent is prepared at a pH of 4.7-4.9.

8. A method according to claim 5, wherein said evaporated condensate further includes melamine.

* * * * *